J. F. WHITFIELD.
MOVING PICTURE APPARATUS.
APPLICATION FILED MAY 10, 1911.

1,015,107.

Patented Jan. 16, 1912.
3 SHEETS—SHEET 1.

J. F. WHITFIELD.
MOVING PICTURE APPARATUS.
APPLICATION FILED MAY 10, 1911.
1,015,107.
Patented Jan. 16, 1912.
3 SHEETS—SHEET 2.
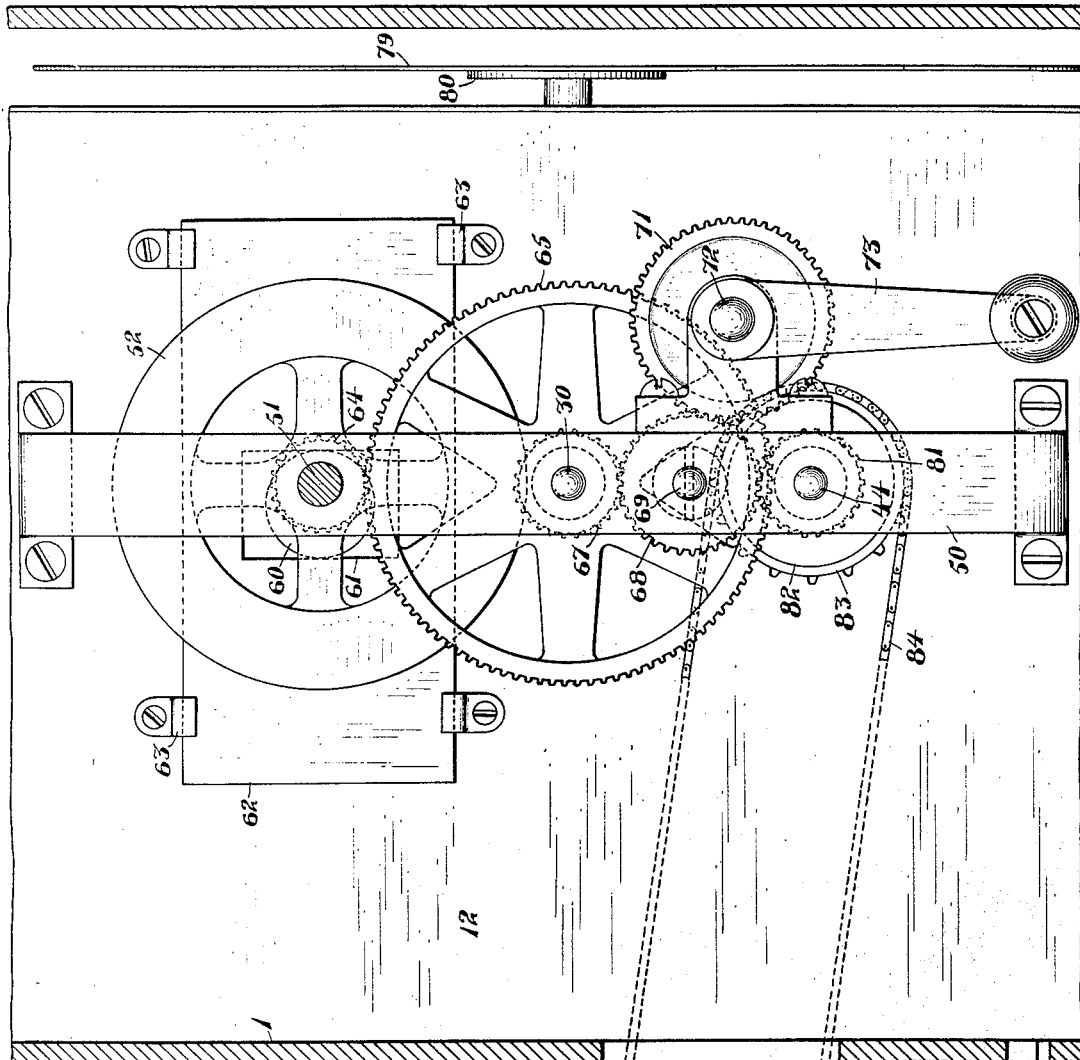
Fig. 2.
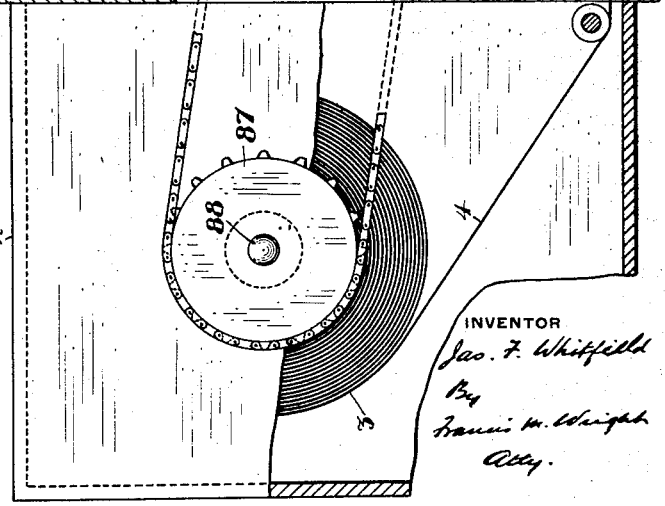
WITNESSES
F. C. Fliedner
N. B. Keating.
INVENTOR
Jas. F. Whitfield
By Francis M. Wright
Atty.

UNITED STATES PATENT OFFICE.

JAMES F. WHITFIELD, OF SAN FRANCISCO, CALIFORNIA, ASSIGNOR TO E. C. MILES, OF SAN FRANCISCO, CALIFORNIA.

MOVING-PICTURE APPARATUS.

1,015,107.   Specification of Letters Patent.   Patented Jan. 16, 1912.

Application filed May 10, 1911. Serial No. 626,167.

*To all whom it may concern:*

Be it known that I, JAMES F. WHITFIELD, a citizen of the United States, residing at San Francisco, in the county of San Francisco and State of California, have invented new and useful Improvements in Moving-Picture Apparatus, of which the following is a specification.

The present invention relates to improved mechanism for use both with a moving picture camera and with a moving picture machine, that is, an apparatus for projecting said pictures upon a screen. In such mechanism it is necessary that the tape or ribbon of films should be maintained in a constant location relative to the lens for a sufficient length of time to enable the sensitized film to be properly affected by the rays of light from the distant object, and should then be moved very rapidly, to move a new portion of the ribbon into the same position relative to the lens. The rapidity of this movement must be such, that an interval, of equal duration to that of the movement, between the projections of successive pictures, when subsequently reproduced, will be imperceptible to the eye, so that the series of pictures will represent faithfully the motion of the distant object. To insure such rapidity of movement, and at the same time retain the films in the relatively stationary position for proper exposure of the sensitized surface of the film has been the principal difficulty encountered in the successful production of moving pictures. The ribbon of films passes between a film track and a tension plate, which presses it tightly against the film track in the focal plane of the lens. The rapid motion of the film between this tension plate and track produces, especially in cold weather, static or frictional electricity, the discharge of which electricity produces on the film markings of the well known form. These markings appear subsequently in the pictures when exhibited, causing them to be imperfect.

The principal object of my invention is to reduce the speed of this movement, while still permitting the film to remain stationary relative to the lens a sufficient length of time to obtain a good picture.

Figure 1:
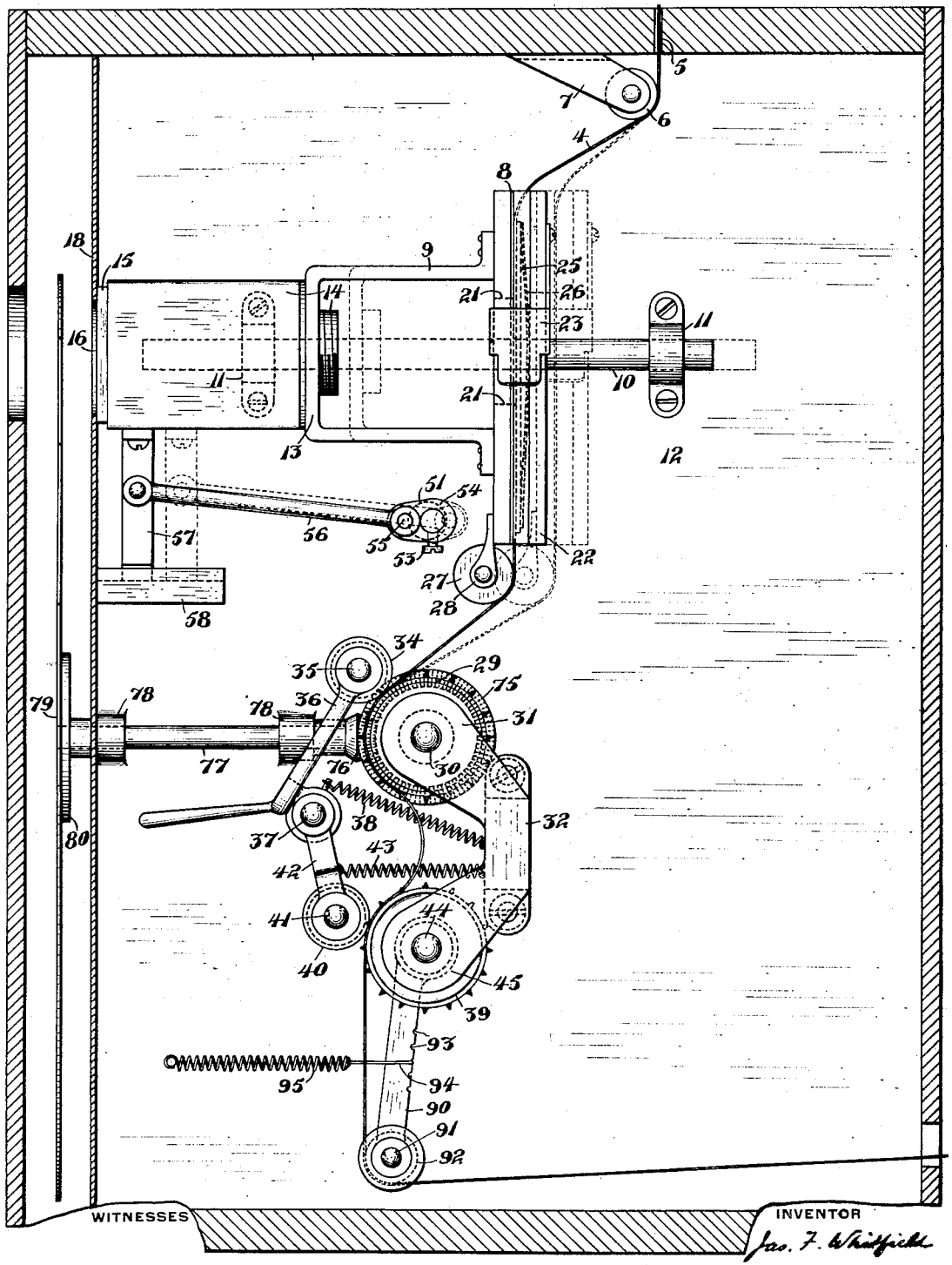
Figure 3:
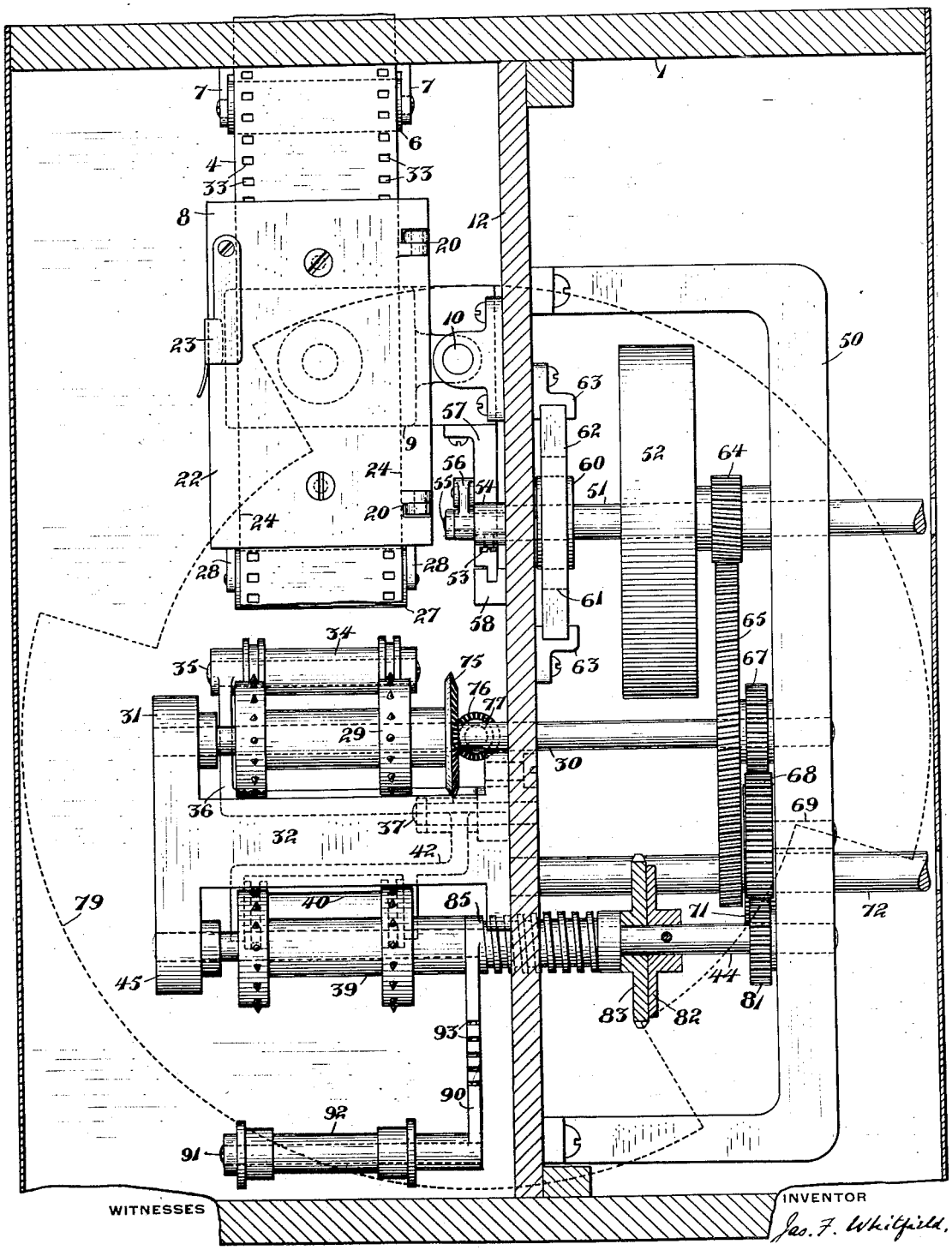

In the accompanying drawing, Figure 1 is a broken side view of my apparatus, a portion of casing being removed; Fig. 2 is a view on the opposite side thereof; Fig. 3 is a vertical section of the apparatus.

Referring to the drawing, 1 indicates a main casing, in which the main portion of my improved mechanism is mounted and 2 an auxiliary casing for a winding wheel 3. The sensitized ribbon 4 forms a suitable supply roll, not shown, passes down through an aperture 5 in the top of the casing 1 around a roller 6 mounted in the ends of fixed arms 7 in said casing, and passes at the rear of a track plate 8, supported upon a rectangular casing 9, which is secured to a slide rod 10, which slides horizontally in bearings 11, secured to a plate 12, forming the main support of the mechanism. Into a front plate 13 of said casing 9 is screwed a lens mounting 14, which mounting, by the sliding movement of said rod 10 in said bearings 11, slides over a wall 15, fitting within the mounting and preventing the rays of light which come to the lens from the exterior object passing to the exterior of said mounting. Said wall 15 is secured to the edge of an opening 16 in the front wall 18 of the casing 1. To a vertical edge of said track plate is hinged, as shown at 20, a back plate 22, the other vertical edge of which carries a pivoted clamp 23, which is adapted to clamp over the edge of the track plate 8 and to secure the back plate and track plate together. Said back plate is recessed, as shown at 24, and in said recess passes vertically downward the sensitized ribbon 4, said ribbon being pressed in said recess by which is commonly known in the art as a tension plate 25, supported upon said back plate by a spring 26. It will thus be seen that, when said back plate is clamped to the track plate, the ribbon is held therein by spring pressure. Said track plate has formed therein an aperture 21 to expose a desired portion of the sensitized ribbon to the action of the rays of light transmitted through the lens.

From the track plate the sensitized ribbon 4 passes around a roller 27 journaled in the end of arms 28 depending from said track plate, and then passes around an upper feed roller 29, secured on a shaft 30, one end of said shaft being mounted in bearings 31 in a bracket 32 secured to the plate 12, and the other end of said shaft passing through said plate and being operated by means hereinafter described. Said feed roller 29 is provided with two circular series of sprockets adapted to enter equidistant holes 33 in the margins of the ribbon and thus advance the ribbon. Retaining said holes in engagement with the sprockets is a so-called tension roller 34 mounted on a shaft 35 carried by an arm 36, pivoted upon a stud shaft 37 projecting from the plate 12 and drawn by a spring 38 against said feed roller.

From the upper feed roller 34 the sensitized ribbon passes around a lower feed roller 39 having, in like manner with the upper feed roller, two circular series of sprockets, which enters the holes 33 in the margins of the ribbon, and which has likewise a lower tension roller 40 on a shaft 41 supported by a bracket 42 pivoted on said stud shaft 37 and withdrawn by a spring 43. Said lower feed roller 39 is mounted on a shaft 44, one end of which has a bearing 45 in said bracket 32 and the other end passes, first, through a bushing 85, hereinafter more particularly described, and then through the plate 12.

On the other side of the plate 12 from the mechanism hereinbefore described is a U-shaped support 50 to provide bearings at one end for shafts. Having its bearings in said support 50 and in the plate 12 is a main shaft 51, carrying a fly wheel 52 and upon which may be secured a crank when it is desired to rotate the said shaft slowly, as, for instance, to take pictures of an object under a poor light. The end which is on the side of the plate 12 opposite to the fly wheel is reduced so as to be eccentric in form, and on said inner end is adjustably secured, by a set screw 53, a crank arm 54 carrying a wrist pin 55, which is attached to one end of a pitman 56 the other end of which is attached to a bracket 57 secured to, and depending from, the lens mounting 14, the lower end of said bracket sliding in a horizontal guide 58 secured to the plate 12. By this means a rapid movement of reciprocation is imparted to the lens and the track plate. In order to prevent vibratory motion being imparted to the entire mechanism by the rapid reciprocation of the lens and track plate, there is mounted on the shaft 51 an eccentric 60, which rotates within a rectangular recess 61 in a plate 62, adapted to slide between bearings 63 secured to the plate 12. Said eccentric is secured on the shaft 51, so that its center of gravity is diametrically opposite that of the track plate and parts movable therewith.

To said main shaft 51 is secured a pinion 64 having spiral teeth, which mesh with a gear wheel 65 also having spiral teeth, said gear wheel 65 being mounted on the shaft 30, hereinbefore described, upon which the upper feed roller 29 is secured.

The ratio of the gearing between the pinion and the gear wheel, and the diameter of the feed roller are such that, with each complete revolution of the main shaft 51 and the pinion 64, the sensitized ribbon is moved through a distance substantially equal to the vertical dimension of the aperture 21 in the track plate.

Mounted upon the shaft 30 is a pinion 67 which meshes with a gear wheel 68 upon a stud shaft 69 having its bearing in the support 50, said gear wheel 68 meshing with a gear wheel 71 on a shaft 72, having its bearings in the support 50 and plate 12, and upon the outer end of which shaft 72 is mounted a crank arm 73 for rotating the main shaft 51 rapidly for ordinary use. Upon said shaft 30 is secured a bevel gear 75, which meshes with a bevel gear 76 on a shaft 77 mounted in bearings 78 secured on the plate 12 and carrying at its end a shutter 79 having a hub 80. The gear wheel 68 also meshes with a gear wheel 81 mounted on the shaft 44, so that said shaft constantly revolves. Secured to said shaft 44 is a friction disk 82, and loose on the shaft 44 adjacent to said friction disk 82 is a sprocket wheel 83, around which is a sprocket chain 84, which in turn engages a sprocket wheel 87 on a shaft 88 of a winding roller 3. An important feature of my invention consists in the means for winding the ribbon 4 upon this roller while the diameter of the roll wound thereon is continually increasing. It is for this reason that the shaft of said roller is driven from the main shaft not positively but only by frictional contact between the sprocket wheel 83 and the disk 82. In order to vary the magnitude of friction between said elements, I mount loosely upon the shaft 44 a sleeve 85 from which depends an arm 90 carrying at its end a shaft 91, on which is mounted a roller 92, around which the ribbon 4 passes in its movement from the lower feed roller to the winding roller. An edge of said arm is formed with a series of notches 93, any one of which can be engaged to a loop 94 connected to an end of a spring 95, the other end of the spring being fixedly supported upon the plate 12. By selecting the notch which is thus operatively connected to said spring, the force transmitted to the roller 92 from said spring may be varied as desired. Said sleeve 85 is formed with a right-handed thread which screws through said plate 12, and the end of said sleeve is adapted to press against said sprocket wheel 83. The following is the mode of operation of this part of the mechanism. The tension of the spring 95 tends to draw the arm 90 to the left, as seen in Fig. 1, and therefore to screw the sleeve 85 into the plate 12, and thus press the end of said sleeve against the sprocket wheel 83, and thus in turn create sufficient pressure between the sprocket wheel 83 and the disk 82 to produce friction to transmit rotation of the main shaft to the shaft of the winding roller 3. But when, owing to the insufficient supply of the ribbon to the winding roller, the tension of the ribbon overcomes the tension of the spring, the arm 90 is moved to the right, so that the threaded portion of the sleeve 85 is unscrewed, thereby withdrawing the end of the sleeve from the sprocket wheel 83, reducing the pressure between the sprocket wheel and the friction disk, and permitting the friction disk to rotate without rotating the sprocket wheel, and the winding roller 3.

It will be seen that, with the above described mechanism, the ribbon and track plate are given a rapid movement of reciprocation. Since this reciprocating motion is derived from a circular motion of the crank shaft the forward motion, when moving toward the object gradually increases from zero at the beginning of the motion and again gradually decreases to zero at the end of the motion. On the other hand, the forward movement of the ribbon never ceases, and, in the direction toward the feed roller, is uniform. It results that, at the beginning of the forward motion of the track plate, when said motion is very slow, the rotation of the feed roller causes the ribbon to slip with reference to the track plate. As the speed of the track plate increases, however, this slipping diminishes, and, at a certain point in its forward motion, the track plate is moving fast enough to overcome this slipping tendency, and the ribbon no longer slips with reference to the track plate. The ribbon therefore is stationary relatively to the lens, although the latter is moving. As the speed of the track plate increases, the motion of the ribbon due to the track plate is more rapid than that due to the feed roller, and a slack occurs in the ribbon between the track plate and feed roller. At a further position the forward motion of the track plate the motion of the ribbon due to the motion of the track plate is not so rapid as that of the ribbon due to the rotary motion of the feed roller, and the slack begins to be taken up. The rapidity of motion of the track plate continually diminishing a point occurs at which the ribbon again slips past the track plate. It is between these two points, at which slipping ceases and at which slipping again begins, that I permit, by means of the rotary shutter, rays of light from the object to pass through the lens to the ribbon on the track plate. The duration of time during which the shutter is open is about two-thirds of the whole length of the time of the forward motion of the track plate, or about one-third of the time of the complete reciprocation of the track plate. During the remaining two-thirds of said complete reciprocation, the film is being moved past the track plate into another position.

It will be seen that I thus provide mechanism of this character which will be comparatively simple and inexpensive in construction, certain and effective in operation, in which the speed of movement of the sensitized ribbon will be reduced, and in which the said speed can be varied to suit surrounding conditions, as, for instance, the actinic strength of the light used, and temperature of the surrounding air and consequent tendency to produce a discharge of static electricity; means for winding up the sensitized ribbon which, while sufficiently powerful to perform its function when the ribbon has become wound up so as to make a roll of great diameter, will yet be regulated when the diameter of the roll is very small as at starting, so that the tension on the ribbon will not be so great as to cause tearing of the same around the holes in the margins.

I claim:

1. In a machine of the character described, the combination of a movable shutter, a lens arranged to reciprocate to and from said shutter, a track plate fixedly connected to, and behind, said lens, means for opening the shutter in the line of said track plate and lens during the motion in one direction of the latter and closing it during the whole of the motion in the opposite direction, and a feed roller for drawing the ribbon across the track plate, so arranged that the ribbon in passing thereto has a movement in the same direction as the movement of the lens and track plate during which the shutter is opened, substantially as described.

2. In a machine of the character described, the combination of a movable shutter, a lens arranged to reciprocate to and from said shutter, means for varying the length of said reciprocation, a track plate fixedly connected to, and behind, said lens, means for opening the shutter in the line of said track plate and lens during the motion in one direction of the latter and closing it during the whole of the motion in the opposite direction, and a feed roller for drawing the ribbon across the track plate, so arranged that the ribbon in passing thereto has a movement in the same direction as the movement of the lens and track plate during which the shutter is opened, substantially as described.

3. In a machine of the character described, the combination of a movable lens, a track plate fixedly connected to the lens, a movable shutter, a movable feed device for a ribbon adapted to move on said track plate, and means for moving in harmony said elements, whereby, during a portion of the motion, the feed device is inoperative to move said ribbon on the track plate and the shutter is inoperative to prevent rays of light passing from the lens on the track plate, and, during the remainder of said motion, the feeding device and shutter are both so operative, substantially as described.

In testimony whereof I have hereunto set my hand in the presence of two subscribing witnesses.

JAMES F. WHITFIELD.

Witnesses:
FRANCIS M. WRIGHT,
D. B. RICHARDS.